United States Patent [19]

Neumann et al.

[11] 4,442,174

[45] Apr. 10, 1984

[54] RUBBER SEALING MEMBER

[75] Inventors: Kurt Neumann, Wassenberg; Wolfgang Dietrich, Cologne, both of Fed. Rep. of Germany

[73] Assignee: Wilhelm Leeser Gummi-und Kunststoffverarbeitung GmbH & Co., KG, Wegberg-Dalheim, Fed. Rep. of Germany

[21] Appl. No.: 473,232

[22] Filed: Mar. 8, 1983

[30] Foreign Application Priority Data

Mar. 11, 1982 [DE] Fed. Rep. of Germany ....... 3208794

[51] Int. Cl.³ .......................... D02G 3/00; B32B 27/06
[52] U.S. Cl. .................................... 428/376; 428/398; 428/421; 428/517
[58] Field of Search .................. 428/71, 76, 158, 159, 428/160, 188, 373, 376, 398, 421, 517, 519

[56] References Cited

U.S. PATENT DOCUMENTS 2,891,288  6/1959  Daley .............................. 428/316.6
3,413,389  11/1968  Footner .......................... 428/316.6

Primary Examiner—William J. Van Balen
Attorney, Agent, or Firm—Sommer & Sommer

[57] ABSTRACT

A cellular, volume compressible, strand-like rubber body has a sheathing of plastic material which surrounds the body without being fixedly connected to it. The rubber body may be of foam rubber material.

7 Claims, 8 Drawing Figures

RUBBER SEALING MEMBER

BACKGROUND OF THE INVENTION

The invention concerns a cellular, volume compressible, strand-like rubber profile member, especially a foam-rubber profile member, with a sheathing, especially for sealing vessels, and, in particular, the covers of drums in the packing industry for carrying goods containing solvents and acids.

When used to seal the cover of a vessel such as a drum, foam-rubber members have the disadvantage that that they are not sufficiently protected against absorption of gas and moisture because of their structure which is cellular and has pores. As a result of the perviousness to fluids and gases as well as to chemicals, these can effect and in certain circumstances corrode the foam-rubber profile member. Furthermore chemical reactions between the foam rubber profile member and the contents of the drum to be sealed cannot be excluded.

From FR-PS No. 23 75 515 it is known to provide a strand-like foam-rubber profile member with a rubber sheathing vulcanised over its periphery. However, for many purposes of use, such a rubber sheathing fixedly connected with the foam-rubber profile member provides insufficient protection for the foam-rubber profile member, because the rubber sheathing is relatively pervious to air and is insufficiently resistant to the effect of goods which contain solvents and acids.

Furthermore there have become known strand-like profile members of foamed plastic material which have a plastics sheathing fixedly connected with the outer periphery of the profile member (FR-PS No. 24 40 502). In this case the properties of the sheathing are indeed more suitable than the properties of the known rubber sheathing of the foam-rubber profile member. On the other hand, however, the elastic properties of the profile member of foamed plastic are considerably more unsuitable than the elastic properties of a cellular, volume compressible rubber profile member, especially one of foam rubber.

SUMMARY OF THE INVENTION

The present invention seeks to remove the disadvantages of the known profile members and to provide a strand-like rubber profile body or member such that, within the necessary limits for its use (that is, especially for the sealing of the covers of drums for the storage of goods containing solvents and acids), it is as impervious as possible and is protected against attack by chemicals. At the same time, however, in profile members in accordance with the invention, the elasticity in the direction of the deformation in the method of employment as compared with that of a profile member consisting exclusively of cellular volume-compressible rubber, remains practically unaltered.

Accordingly the invention provides a cellular compressible elongated rubber member having a sheathing of plastic material, the thickness of said sheathing being less than the cross-sectional dimension of said member, and said sheathing enclosing said member without being fixedly connected thereto.

BRIEF DESCRIPTION OF THE DRAWINGS

Preferred embodiments of the present invention will now be described, by way of example only, with reference to the accompanying drawings, of which.

DESCRIPTION OF THE PREFERRED EMBODIMENTS

Basically the invention provides a rubber profile member with a plastic sheathing of a thickness which is smaller than the cross-sectional dimension of the rubber profile member, the outer dimension of the sheathing being approximately the same as the outer dimensions of the rubber profile member, and the sheathing enveloping the rubber profile body without a fixed connection.

The thickness of the plastic sheathing is preferably of the order of magnitude of 0.2 mm. It is possible with the invention to exploit the barrier properties of the plastic material with regard to imperviousness to air and chemical resistance. At the same time the elasticity of the rubber profile member, which preferably consists of foam rubber, in the direction of the deformation in the method of employment is not impaired or is impaired only to a negligible extent.

Whereas in the known profile bodies or members the sheathing is fixedly connected to the core and consists of a material on the same basis as the core (that is, for example, a rubber core with a rubber sheathing vulcanised thereon or a foamed plastic core with a fixedly-connected plastic sheathing), in accordance with the invention there are combined together materials which by their nature could not be connected together or could be connected together only with great expense, namely a rubber profile member, preferably a foamed rubber profile member, with a thin plastic sheathing, which encloses the rubber profile member without being fixedly connected to it. The invention thus recognises that for the intended main use, that is, for the sealing of the covers of drums for the storage of goods which contain solvents and acids particularly in the packing industry, it is not essential to connect the profile member fixedly with the sheathing. Thus it is possible to combine materials which cannot be connected to each other, or can be connected to each other only with indefensibly high expenditure, and thus to reconcile in an advantageous manner the preferred properties of the materials; that is, on the one hand the high elasticity, and, on the other hand, the suitable barrier properties.

Polyethylene is suitable as the material for the plastic sheathing especially when the profile member is to come into contact with foods. A plastic sheathing of polyvinylidene fluoride material is especially resistant to acids and chemicals.

Figure 1:
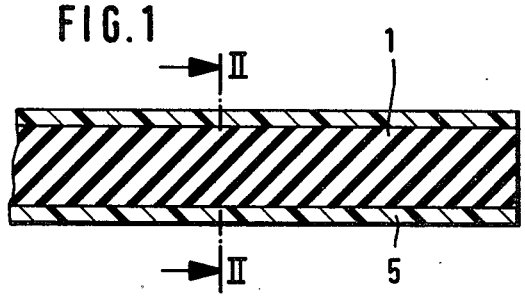
FIG. 1 shows a schematic longitudinal section through a profile body according to the invention.
Figure 2:
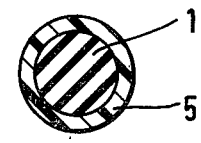
FIG. 2 shows a section along the line II—II in FIG. 1.
Figure 3:
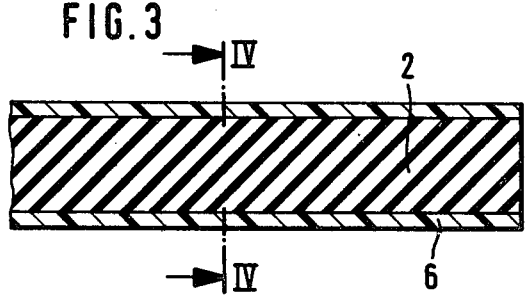
FIG. 3 shows a longitudinal section through a further embodiment of the invention.
Figure 4:
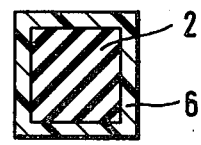
FIG. 4 shows a section along the line IV—IV in FIG. 3.
Figure 5:
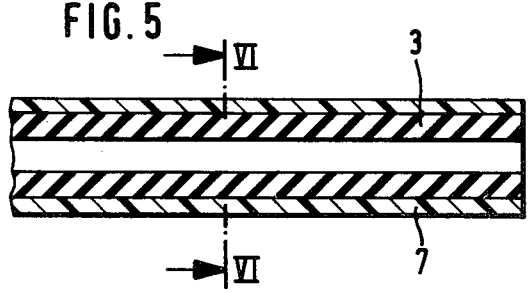
FIG. 5 shows a longitudinal section through a further embodiment of the invention.
Figure 6:
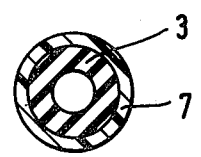
FIG. 6 shows a section along the line VI—VI in FIG. 5.
Figure 7:
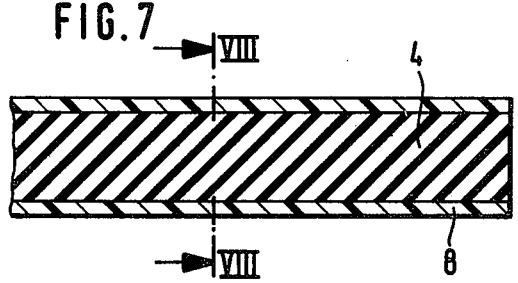
FIG. 7 shows a section through a further embodiment of the invention.
Figure 8:
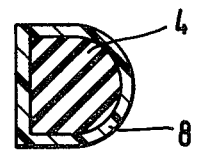
FIG. 8 shows a section along the line VIII—VIII in FIG. 7.

Referring now to the drawings, the profile members or bodies illustrated are in each case of differing cross-section. The profile body 1 illustrated in FIGS. 1 and 2 is round, the profile body 2 illustrated in FIGS. 3 and 4 is of square cross-section, the profile body 3 illustrated in FIGS. 5 and 6 is constructed in the form of a tube, and the profile body 4 illustrated in FIGS. 7 and 8 has a tunnel shape. The strand-like profile bodies consist of cellular volume-compressible rubber, for example of foam-rubber. By means of a plastic sheathing, designated by numerals 5, 6, 7 or 8, the elastic core is protected against the absorption of gas and moisture, and the resistance to chemicals and/or the mechanical capacity to withstand stresses is raised. The sheathing 5, 6, 7 or 8 envelops the rubber profile body 1, 2, 3 or 4 without being fixedly connected to the latter. The thickness of the plastic sheathing has preferably the order of magnitude of about 0.2 mm. The thickness of the plastic sheathing is considerably thinner than the cross-sectional dimension of the corresponding rubber profile body. The representation of the sheathing in the drawings does not correspond to its actual size. In comparison to the respective cross-sectional dimension of the rubber profile body the thickness of the plastic sheathing is shown for the purposes of better illustration, as being considerably greater than its actual relative size. The application of the sheathing can be achieved, for example, in an extrusion process. The profile body constructed in accordance with the invention can be used, for example, as a sealing element. The profile shape is basically arbitrary and any desired profile may be chosen.

It will be understood that the above description of the present invention is susceptible to various modifications, changes and adaptations.

What is claimed is:

1. A cellular compressible elongated rubber member having a sheathing of plastic material, the thickness of said sheathing being less than the cross-sectional dimension of said member, and said sheathing enclosing said member without being fixedly connected thereto.

2. A member as claimed in claim 1 and being of foam rubber material.

3. A member as claimed in claim 1, the thickness of said plastic sheathing being of the order of 0.2 mm.

4. A member as claimed in claim 1, said plastic sheathing being resistant to chemicals.

5. A member as claimed in claim 1, said plastic sheathing consisting of polyethylene.

6. A member as claimed in claim 1, said plastic sheathing consisting of polyvinylidene fluoride.

7. A member as claimed in claim 1, the outer dimensions of said plastic sheathing and said rubber member being approximately the same.

* * * * *